United States Patent
Tseng et al.

(10) Patent No.: US 8,223,617 B2
(45) Date of Patent: *Jul. 17, 2012

(54) DEVICE FOR REDUCING POWER CONSUMPTION OF OPTICAL DRIVE AND METHOD FOR THE SAME

(75) Inventors: Chao-Hsin Tseng, Taipei (TW); Hsu-Feng Ho, Taipei (TW)

(73) Assignee: Media Tek Inc, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/306,456

(22) Filed: Nov. 29, 2011

(65) Prior Publication Data

US 2012/0072930 A1 Mar. 22, 2012

Related U.S. Application Data (63) Continuation of application No. 12/699,743, filed on Feb. 3, 2010, which is a continuation of application No. 10/933,402, filed on Sep. 3, 2004, now abandoned.

(51) Int. Cl.
*G11B 7/00* (2006.01)
(52) U.S. Cl. ................ 369/189; 369/53.35; 369/124.15; 369/124.05
(58) Field of Classification Search .............. 369/53.28, 369/47.1, 53.1, 53.26, 47.52, 47.5, 59.17, 369/124.15, 53.23, 189, 53.35, 44.34, 47.35, 369/124.05
See application file for complete search history.

(56) References Cited

U.S. PATENT DOCUMENTS

| | | | | |
|---|---|---|---|---|
| 4,764,860 A * | 8/1988 | Takao | | 369/43 |
| 4,783,774 A * | 11/1988 | Enomoto | | 369/44.27 |
| 5,084,661 A * | 1/1992 | Tanaka | | 318/685 |
| 5,323,368 A * | 6/1994 | Semba | | 369/30.17 |
| 6,236,628 B1 * | 5/2001 | Kim | | 369/44.41 |
| 6,760,299 B1 * | 7/2004 | Nakajima et al. | | 369/275.4 |
| 2002/0097643 A1 * | 7/2002 | Kadlec et al. | | 369/44.13 |
| 2003/0035352 A1 * | 2/2003 | Worthington | | 369/47.35 |
| 2003/0099176 A1 * | 5/2003 | Okada | | 369/53.18 |
| 2004/0057350 A1 * | 3/2004 | Nakajima et al. | | 369/43 |
| 2004/0228234 A1 * | 11/2004 | Tateishi et al. | | 369/44.29 |

* cited by examiner

*Primary Examiner* — Thomas Alunkal
(74) *Attorney, Agent, or Firm* — Birch, Stewart, Kolasch & Birch, LLP (57) ABSTRACT

A device and method for reducing power consumption of an optical drive are proposed. The present invention samples a carrier control signal and then compares the samples of the signals with predetermined threshold signals. According to the comparison result, the present invention produces at least one diphase excitation control signal. The diphase excitation control signal comprises at least one impulse signal, and a negative edge of the impulse signal is adjusted to a predetermined level during the period of the diphase excitation control signal. The present invention reduces the time for outputting the control signals and greatly reduces the power consumption of the optical drive thereby.

19 Claims, 6 Drawing Sheets

DEVICE FOR REDUCING POWER CONSUMPTION OF OPTICAL DRIVE AND METHOD FOR THE SAME

CROSS REFERENCE TO RELATED APPLICATION

This application is a continuation of application Ser. No. 12/699,743 filed on Feb. 3, 2010, which is a continuation of application Ser. No. 10/933,402 filed on Sep. 3, 2004 now abandoned. The entire contents of each of these applications are hereby incorporated by reference.

BACKGROUND OF THE INVENTION

1. Field of the Invention

The present invention is directed to a device for reducing power consumption of an optical drive and a method for the same, and more particularly, to a device and a method used to reduce the power consumed in track following so as to conserve power.

2. Description of Related Art

In the optical drives used nowadays, track following is an action that consumes an extreme amount of time and power. However, this action must be fast enough to improve access speed. Since this action is performed in many applications, various searching algorithms available on the market have been developed to make this action more efficient. However, the power consumption thereof is still excessive.

Figure 1:
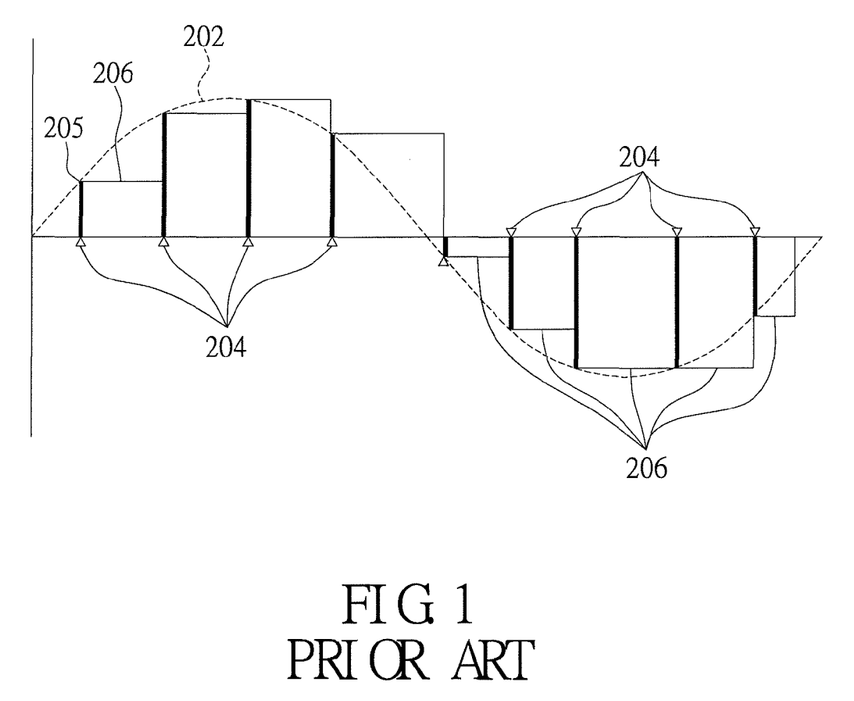
FIG. 1 is a diagram for illustrating track-following control signals of an optical drive in the prior art.

Reference is made to FIG. 1, which illustrates the track-following signals used nowadays. The sinusoidal wave is a carrier control signal 202. The conventional method is to obtain specific sample voltages 205 at some specific sample times 204 and then output these sample voltages 205 as diphase excitation control signals 206. Every diphase excitation control signal 206 will maintain its voltage value until the next sampling time 205 to control the rotation direction of the carrier motor or to stop it.

In the present invention, a novel track-following method is proposed to replace the conventional one to save power and further promote efficiency.

SUMMARY OF THE INVENTION

An objective of the present invention is to provide a device and method for reducing power consumption of an optical drive.

According to an embodiment of the present invention, a device for reducing power consumption of an optical drive is provided. The device comprises a signal controller for producing a carrier control signal; a signal processor for sampling the carrier control signal to produce a first output signal; a comparator for receiving the first output signal of the signal processor, and comparing the first output signal with at least one threshold signal to produce a second output signal; and a waveform generator for producing at least one diphase excitation control signal according to the second output signal, wherein the diphase excitation control signal comprises at least one impulse signal, and a negative edge of the impulse signal is adjusted to a predetermined level during the period of the diphase excitation control signal.

According to a second embodiment of the present invention, a method for reducing power consumption of an optical drive is provided. The method comprises inputting a carrier control signal to a signal processor; sampling the carrier control signal to obtain a sampled carrier control signal by using the signal processor; inputting the sampled carrier control signal to a comparator and comparing the sampled carrier control signal with at least one threshold signal by using the comparator; producing an output signal index according to a comparison result provided by the comparator; and outputting at least one diphase excitation control signal according to the output signal index by using a waveform generator, wherein the diphase excitation control signal comprises at least one impulse signal, and a negative edge of the impulse signal is adjusted to a predetermined level during the period of the diphase excitation control signal.

Numerous additional features, benefits and details of the present invention are described in the detailed description, which follows.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF PREFERRED EMBODIMENTS

Figure 2:
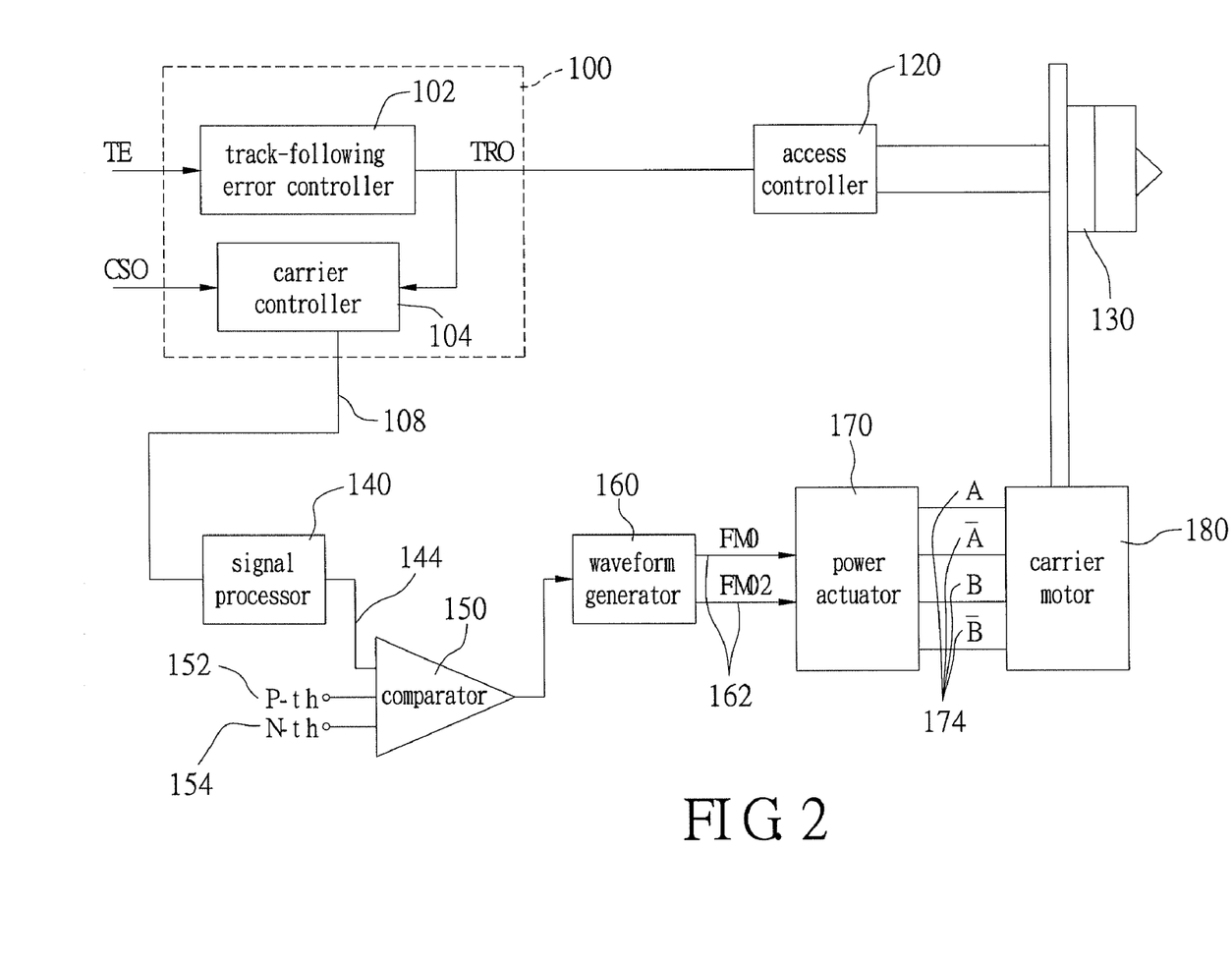
FIG. 2 is a diagram of a preferred embodiment of a device for reducing power consumption of an optical drive in accordance with the present invention.

The present invention relates to a device for reducing power consumption of an optical drive and a method for the same. Reference is made to FIG. 2, which is an embodiment of the present invention. The device includes a signal controller 100, an access controller 120, a signal processor 140, a comparator 150, a waveform generator 160, a power actuator 170 and a carrier motor 180. After the signal controller 100 receives a track-following error signal (TE) and a central error signal (CSO), it outputs a track-following control signal (TRO), which is sent to the access controller 120 and used to control the pick-up head 130 to read or write the data.

The signal controller 100 outputs a carrier control signal 108 to the signal processor 140, which samples the carrier control signal 108 and send the sampled carrier control signal 144 to the comparator 150. The comparator compares the sampled carrier control signal 144 with the positive threshold signal (P-th) 152 and the negative threshold signal (N-th) 154 and then sends out an output signal index. If the sampled carrier control signal 144 is larger than the positive threshold signal 152, the comparator 150 adds one to the output signal index. If the sampled carrier control signal 144 is smaller than the negative threshold signal 154, the comparator 150 subtracts one from the output signal index. The waveform generator 160 outputs the diphase excitation control signals 162 (FMO and FMO2) periodically with equal time spacing according to the output signal index sent from the comparator 150. As the output signal index increases or decreases, the phases of the diphase excitation control signals 162 changes accordingly so as to control the power actuator 170. Then, the power actuator 170 generates the complementary motor control signals to make the carrier motor 180 rotate forward or backward, or make it stop so as to control the pickup head 130 thereby.

Figure 3A:
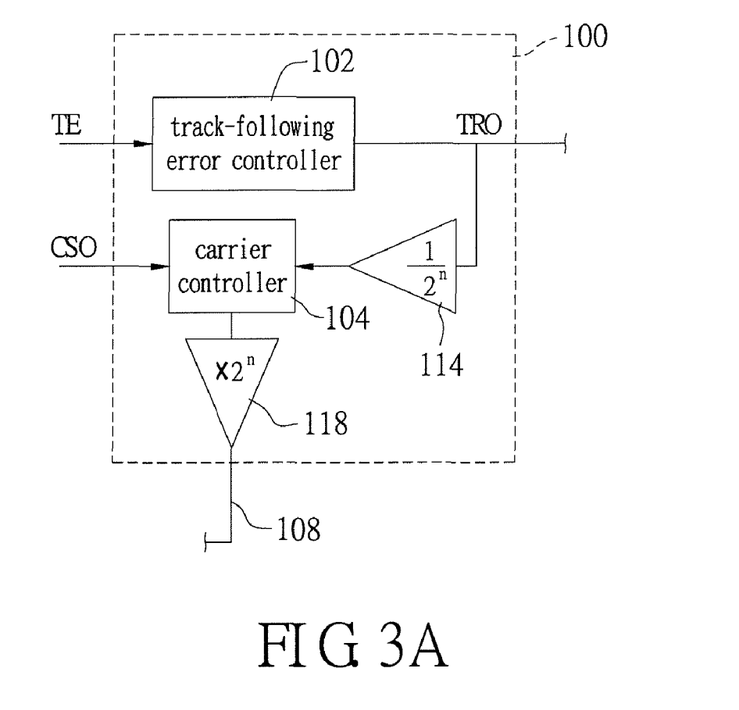
FIG. 3A is a diagram of an internal structure of the signal controller in accordance with the present invention.

Reference is made to FIG. 3A, which is a diagram of an internal structure of the signal controller in accordance with the present invention. The signal controller includes a track-following error controller 102, a carrier controller 104 and amplifiers 114, 118. After the track-following error controller 102 receives the track-following error signal (TE), it outputs the track-following control signal (TRO) accordingly. Then, the track-following control signal is delivered to the access controller 120 and the amplifier 114. The carrier controller 104 then selectively sends out the track-following control signal (TRO) or the central error signal (CSO). In other words, the carrier control signal 108 can be the track-following control signal (TRO) or the central error signal (CSO).

If the track-following control signal (TRO) is selected, the amplifier 114 diminishes the same to avoid signal overflow caused by the carrier controller 104. Then, the amplifier 118 recovers the amplitude of the track-following control signal (TRO) when the track-following control signal (TRO) is output from the carrier controller 104.

Figure 3B:
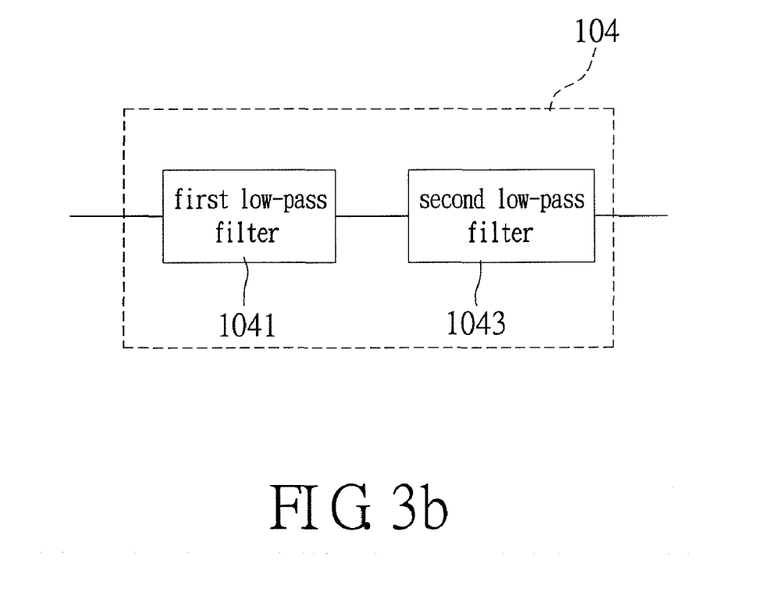
FIG. 3B is a diagram of an internal structure of the carrier controller in accordance with the present invention.

Reference is made to FIG. 3B. The carrier controller 104 is composed of a first low-pass filter 1041 cascaded with a second low-pass filer 1043. The first low-pass filter 1041 has a high sample rate while the second low-pass filter 1043 has a low sample rate.

Figure 4:
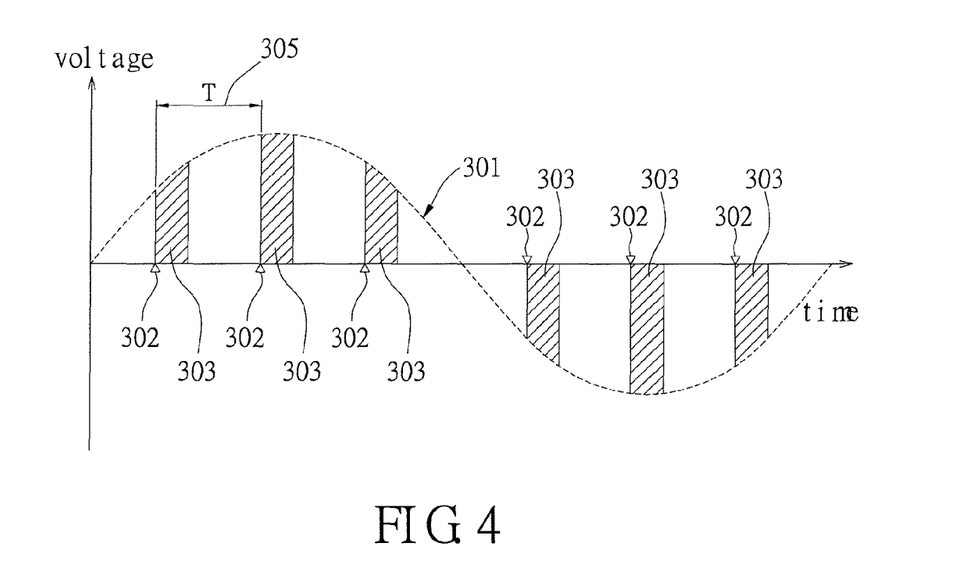
FIG. 4 is a waveform diagram of diphase excitation control signals provided by the waveform generator in accordance with the present invention.

Reference is made to FIG. 4, which shows the diphase excitation control signals produced by the waveform generator 160. The vertical axis represents voltage value while the horizontal axis represents time. The sinusoidal wave 301 corresponds to the carrier control signal 108 mentioned above and the periodic signals 303 are the output signals of the waveform generator 160. The periodic signals 303 are generated by sampling the carrier sample signal 108, i.e., the sampled carrier control signals 144, after the comparator 150 processes these sample signals. When compared with the sinusoidal signal used in the prior art, using the periodic signals 303 can reduce the power consumption of the optical drive. The use of the periodic signals 303 will be further illustrated in FIG. 6A.

After receiving the carrier control signal 108, the signal processor 140 samples the carrier control signal 108 according to the predetermined sample rate and the corresponding time spacing 305. The sample rate can be the sample rate of the second low-pass filter 1043 mentioned above. The carrier control signal 108 is sampled at the sample time 302 to provide the sampled carrier control signal 144 for the comparator 150. Then, the comparator 150 compares the sampled control signal 144 with the positive threshold signal 152 and the negative threshold signal 154.

Figure 5:
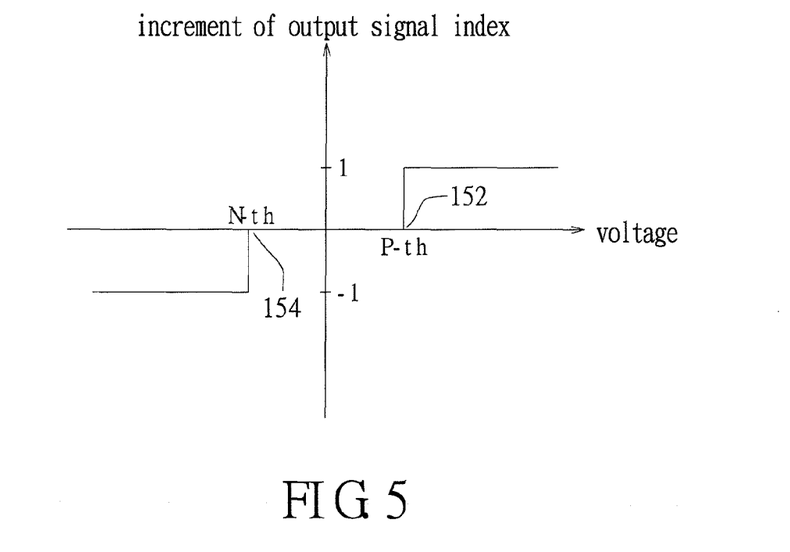
FIG. 5 is a waveform diagram of an output signal index provided by the comparator in accordance with the present invention.

Reference is made to FIG. 5, which is an embodiment of the present invention. In the figure, the vertical axis represents the increment of the output signal index output from the comparator 150 while the horizontal axis represents the threshold voltage. If the sampled carrier control signal 144 is larger than the positive threshold signal 152, the comparator 150 adds one to the output signal index. If the sampled carrier control signal 144 is smaller than the negative threshold signal 154, the comparator 150 subtracts one from the output signal index. If the sampled carrier control signal 144 is located in the middle between the positive threshold signal 152 and the negative threshold signal 154, the output signal index is maintained.

Figure 6A:
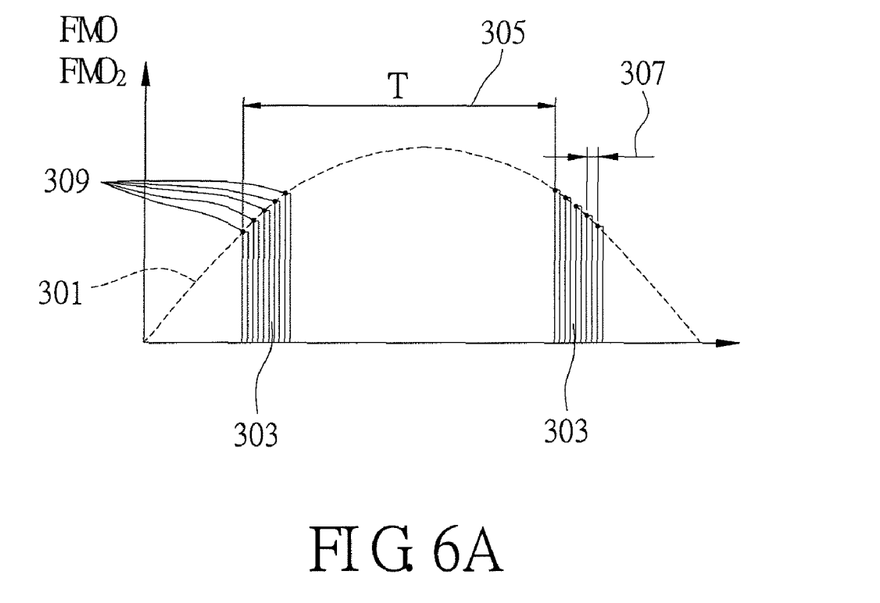
FIG. 6A is a waveform diagram of diphase excitation control signals formed by using a group of gain signals in accordance with the present invention.

Reference is made to FIG. 6A, which is an embodiment of the present invention. The increase of the output signal index means the sampled carrier control signal 144 is larger than the positive threshold signal 152. At this point, the waveform generator 160 samples the carrier control signal 108 continuously according to the waveform of the carrier control signal 108 and outputs a predetermined number of impulse signals 309 with equal time spacing 307. These impulse signals 309 are the diphase excitation control signals 162 mentioned above. The increase of the output signal index makes the motor 180 rotate forward. On the other hand, the decrease of the output signal index means the sampled carrier control signal 144 is smaller than the negative threshold signal 154 and makes the motor 180 to rotate backward by the same mechanism described above.

The sample rate of the diphase excitation control signals 162 can be the sample rate of the first low-pass filter 1041. Since the first low-pass filter 1041 has a high sample frequency and the second low-pass filter 1043 has a low sample frequency, the time spacing 305 of the carrier control signal 108 is larger than the time spacing 307 of the diphase excitation control signals 162. After that, the waveform generator 160 does not produce any signal and the power actuator 170 maintains operations according to the previous diphase excitation control signals 162.

Generally, the power consumption is proportional to the output time of the diphase excitation control signals 162. In the present invention, the sinusoidal wave 301, i.e., the carrier control signal, is sampled to provide the periodic signals 303, which are composed of the impulse signals 309 and can be used as the diphase excitation control signals 162. Furthermore, the sample number is adjustable.

Comparing the diphase excitation control signals 162 shown in FIG. 6A to the diphase excitation control signal 206 shown in FIG. 1, it is seen that the diphase excitation control signals 162 of the present invention include several periodic signals 303 each having a predetermined number of impulse signals 309, which are the samples of the sinusoidal wave 301. Furthermore, the control signal 206 of the prior art is formed by sampling the carrier control signal 202 and then keeping the sample voltage value until the next sampling time. Since the diphase excitation control signals 162 of the present invention do not need to last for the whole period of the sinusoidal wave 301 to control the rotation of the carrier motor 180, power consumption is greatly reduced. Thus, the excitation control signals 162 of the present invention only need to last for a small segment of the whole period to control the carrier motor 180. That not only saves the electric power considerably but also maintains the operation of the carrier motor 180 efficiently.

In FIG. 6A, the waveform generator 160 employs a group of gain signals to adjust the positive edges of the impulse signals 309. The waveform generator 160 directly drops the amplitude of the negative edges to zero rather than using the gain signals to adjust them. Since the diphase excitation control signal 162 is composed of multiple impulse signals 309, the stability of the pickup head 160 is affected because the huge variation of the impulse signals 309 makes the motor 180 vibrate easily.

Figure 6B:
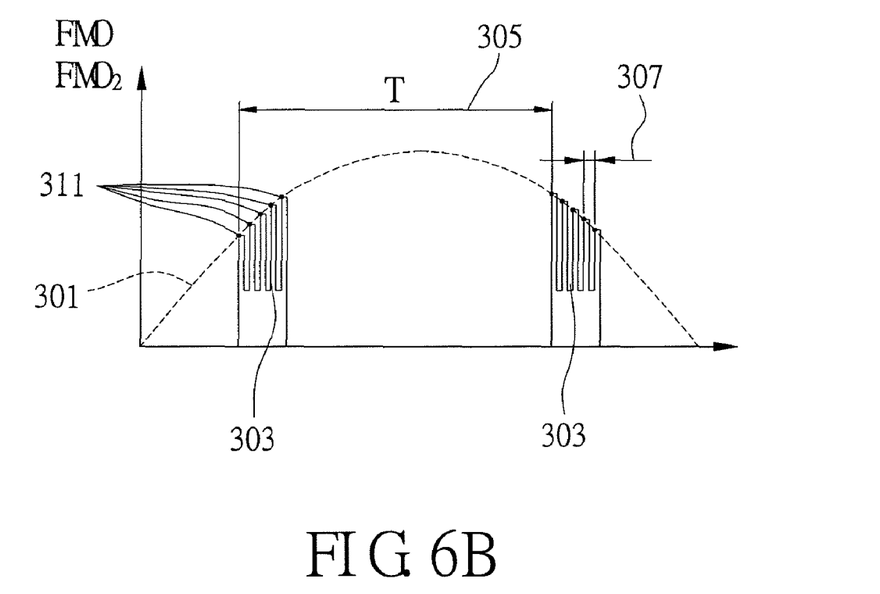
FIG. 6B is a waveform diagram of diphase excitation control signals formed by using two groups of gain signals in accordance with the present invention.

Therefore, the present invention also provides another embodiment. As shown in FIG. 6B, the impulse signals 309 shown in FIG. 6A are replaced by the impulse signals 311. The waveform generator 160 in this embodiment employs two groups of gain signals to adjust the positive and negative edges of the impulse signals 311, respectively. Hence, the negative edge of the impulse signal 311 does not drop to zero directly but to the middle, between the amplitude of the positive edge and zero. Thus, the vibration problem of the carrier motor 180 caused by the impulse signals 309 is resolved.

When the carrier motor 180 moves the pickup head 130 to the correct optical track, the central error signal (CSO) is zero, as is the carrier control signal 108. Hence, the output signal index sent from the comparator 150 is unchanged and the waveform generator 160 stops producing the diphase excitation control signal 162. Meanwhile, the power actuator 170 also stops producing the complementary motor control signals 174 so as to stop the carrier motor 180. Then, the pickup head 130 starts to access data.

Figure 7:
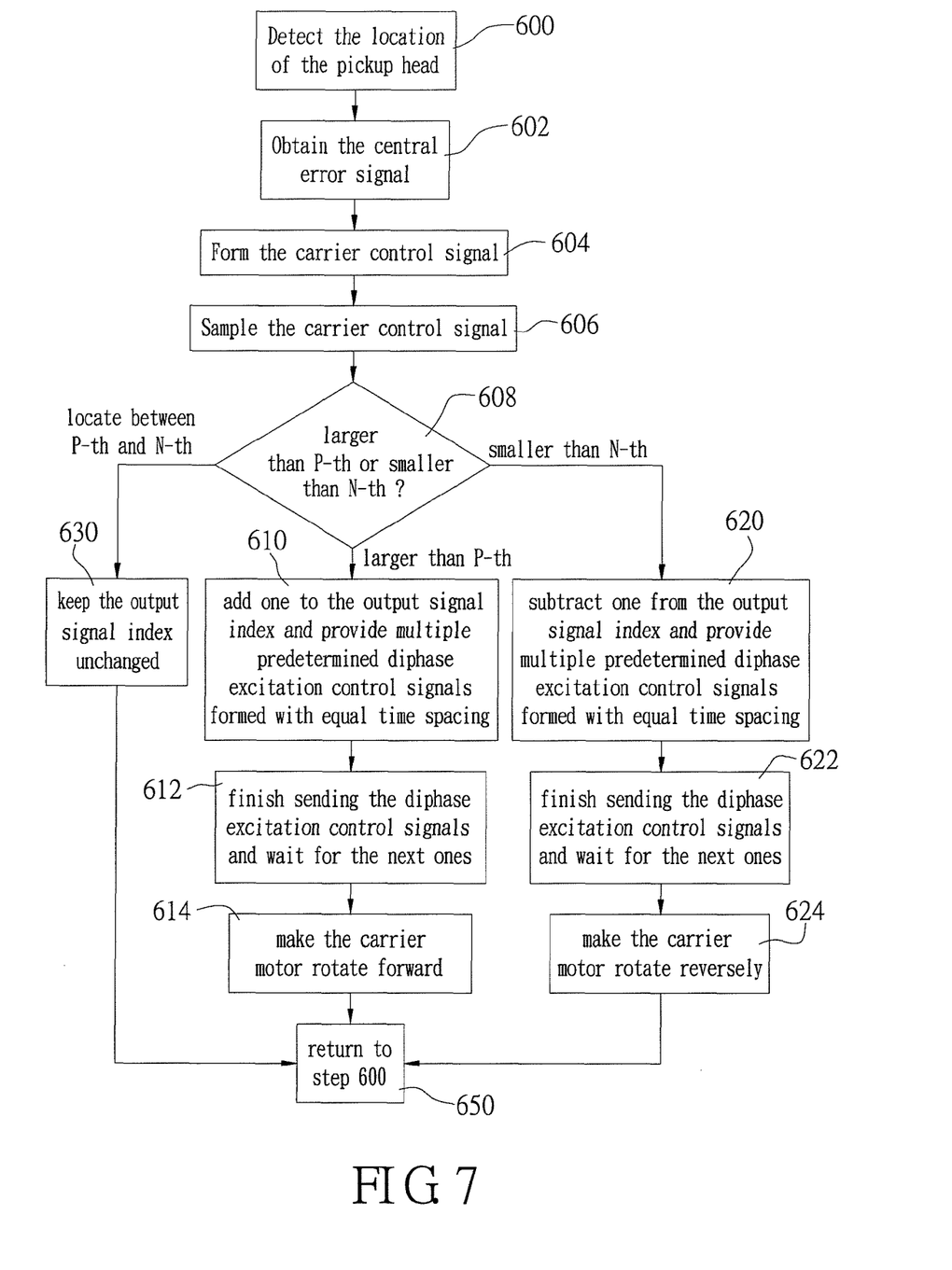
FIG. 7 is a flowchart of a method for reducing power consumption of an optical drive in accordance with the present invention.

Reference is made to FIG. 7, which is a flowchart of a method for reducing power consumption of an optical drive in accordance with the present invention. The method includes the steps as follows. The location of the pickup head is detected to calculate the distance between the pickup head and the target track (600). The central error signal, which represents the distance between the pickup head and the target track, is obtained (602). The carrier control signal is formed, by the carrier controller processing the central error signal, and output (604). The carrier control signal is sampled to obtain the sampled carrier control signal (606). The sampled carrier control signal is compared with the positive and negative threshold signals to determine whether the sampled carrier control signal is larger than the positive threshold signal (P-th) or smaller than the negative threshold signal (N-th), or just located between the positive and negative threshold signals (608).

If the sampled carrier control signal is larger than the positive threshold signal, the process jumps to step 610. If the sampled carrier control signal is smaller than the negative threshold signal, the process jumps to step 620. If the sampled carrier control signal is located between the positive and negative threshold signals, the process jumps to step 630.

In the case where the sampled carrier control signal is larger than the positive threshold signal, one is added to the output signal index. Then, due to the increase of the output signal index, the waveform generator 160 provides multiple predetermined diphase excitation control signals formed with equal time spacing to the power actuator. After finishing sending the diphase excitation control signals, the waveform generator 160 stops providing the signals to reduce power consumption and wait for the next diphase excitation control signals (612). Although the waveform generator 160 stops providing the signals, the power actuator keeps outputting the motor control signals to make the carrier motor rotate forward (614) according to the diphase excitation control signals received last.

In the case where the sampled carrier control signal is smaller than the negative threshold signal, one is subtracted from the output signal index (620). Then, due to the decrease of the output signal index, the waveform generator 160 provides multiple predetermined diphase excitation control signals formed with equal time spacing to the power actuator. When compared with the diphase excitation control signals mentioned in the above paragraph, it is evident that the diphase excitation control signals at this step have an opposite phase.

After finishing sending the diphase excitation control signals, the waveform generator 160 stops providing the signals to reduce power consumption and waits for the next diphase excitation control signals (622). Although the waveform generator 160 stops providing the signals, the power actuator keeps outputting the motor control signals to make the carrier motor rotate backward (624) according to the diphase excitation control signals received last.

In the case where the sampled carrier control signal is located between the positive and negative threshold signals, the output signal index remains unchanged (630). Hence, the output signal of the waveform generator 160 returns to zero and the power actuator stops outputting motor control signals to the carrier motor so as to stop the carrier motor. The steps above is performed repeatedly (650) to move the pickup head to the correct access position.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are embraced within the scope of the invention as defined in the appended claims.

What is claimed is:

1. A device for reducing power consumption of an optical drive, comprising:
   a signal controller for producing a carrier control signal;
   a signal processor for sampling the carrier control signal to produce a first output signal;
   a comparator for receiving the first output signal of the signal processor, and comparing the first output signal with at least one threshold signal to produce a second output signal; and
   a waveform generator for producing at least one diphase excitation control signal according to the second output signal, wherein the diphase excitation control signal comprises at least one impulse signal, and a negative edge of the impulse signal is adjusted to a predetermined level during the period of the diphase excitation control signal.

2. The device as claimed in claim 1, wherein the signal processor samples the carrier control signal to output a sampled carrier control signal.

3. The device as claimed in claim 2, wherein the second output signal sent from the comparator is an output signal index.

4. The device as claimed in claim 3, wherein the comparator adds one to the output signal index if the sampled carrier control signal is larger than a positive threshold signal, the comparator subtracts one from the output signal index if the sampled carrier control signal is smaller than a negative threshold signal, and the comparator maintains the output signal index if the sampled carrier control signal is located between the positive threshold signal and the negative threshold signal.

5. The device as claimed in claim 4, wherein phase of the diphase excitation control signal is changed as the output signal index is changed.

6. The device as claimed in claim 1, wherein the waveform generator employs a group of gain signals to adjust a positive edge of the diphase excitation control signal.

7. The device as claimed in claim 1, wherein the waveform generator employs two groups of gain signals to adjust a positive edge and a negative edge of the diphase excitation control signal, respectively.

8. The device as claimed in claim 1, further comprising a power actuator, receiving the diphase excitation control signal to produce two groups of motor control signals so as to make a carrier motor rotate forward or backward.

9. The device as claimed in claim 8, wherein after received the diphase excitation control signal, the power actuator stops receiving the diphase excitation control signal and keeps outputting the two groups of the motor control signals to make the carrier motor rotate forward or backward according the diphase excitation control signal received last.

10. A method for reducing power consumption of an optical drive, comprising:
inputting a carrier control signal to a signal processor;
sampling the carrier control signal to obtain a sampled carrier control signal by using the signal processor;
inputting the sampled carrier control signal to a comparator and comparing the sampled carrier control signal with at least one threshold signal by using the comparator;
producing an output signal index according to a comparison result provided by the comparator; and
outputting at least one diphase excitation control signal according to the output signal index by using a waveform generator, wherein the diphase excitation control signal comprises at least one impulse signal, and a negative edge of the impulse signal is adjusted to a predetermined level during the period of the diphase excitation control signal.

11. The method as claimed in claim 10, wherein phase of the diphase excitation control signal is changed as the output signal index is changed.

12. The method as claimed in claim 10, further comprising:
adding one to the output signal index if the sampled carrier control signal is larger than a positive threshold signal.

13. The method as claimed in claim 12, further comprising sending the diphase excitation control signal to a power actuator to make the power actuator produce two groups of motor control signals so as to make a carrier motor rotate forward.

14. The method as claimed in claim 13, further comprising: after finishing sending the diphase excitation control signal to the power actuator, stopping sending the diphase excitation control signal and the power actuator keeps outputting the two groups of the motor control signals to make the carrier motor rotate forward according the diphase excitation control signal received last.

15. The method as claimed in claim 10, further comprising:
subtracting one from the output signal index if the sampled carrier control signal is smaller than a negative threshold signal.

16. The method as claimed in claim 15, further comprising sending the diphase excitation control signal to a power actuator to make the power actuator produce two groups of motor control signals so as to make a carrier motor rotate backward.

17. The method as claimed in claim 16, further comprising after finishing sending the diphase excitation control signal to the power actuator, stopping sending the diphase excitation control signal and the power actuator keeps outputting the two groups of the motor control signals to make the carrier motor rotate backward according the diphase excitation control signal received last.

18. The method as claimed in claim 10, further comprising employing a group of gain signals to adjust a positive edge of the diphase excitation control signal.

19. The method as claimed in claim 10, further comprising employing two groups of gain signals to adjust a positive edge and a negative edge of the diphase excitation control signal, respectively.

* * * * *